US 11,149,954 B2

(12) United States Patent
Tangirala et al.

(10) Patent No.: US 11,149,954 B2
(45) Date of Patent: Oct. 19, 2021

(54) MULTI-CAN ANNULAR ROTATING DETONATION COMBUSTOR

(71) Applicant: General Electric Company, Schenectady, NY (US)

(72) Inventors: Venkat Eswarlu Tangirala, Niskayuna, NY (US); Narendra Digamber Joshi, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 371 days.

(21) Appl. No.: 15/795,894

(22) Filed: Oct. 27, 2017

(65) Prior Publication Data
US 2019/0128529 A1 May 2, 2019

(51) Int. Cl.
*F23R 7/00* (2006.01)
*F02C 5/02* (2006.01)
(Continued)

(52) U.S. Cl.
CPC .................. *F23R 7/00* (2013.01); *F02C 5/02* (2013.01); *F23R 3/46* (2013.01); *F02C 3/04* (2013.01); *F02K 7/10* (2013.01)

(58) Field of Classification Search
CPC ...... F02C 5/04; F02C 5/02; F02C 3/16; F23R 7/00; F02K 7/10
See application file for complete search history.

(56) References Cited

U.S. PATENT DOCUMENTS 2,555,081 A * 5/1951 Goddard .................... F02K 9/66
60/201
2,602,290 A * 7/1952 Goddard .................... F02K 9/52
60/257

(Continued)

FOREIGN PATENT DOCUMENTS

CN 204042975 U 12/2014
CN 104612821 A 5/2015
(Continued)

OTHER PUBLICATIONS

Hyeong Yi et al., "A Three-Dimensional Numerical Study of Rotational Detonation in an Annular Chamber", 47th AIAA Aerospace Sciences Meeting Including The New Horizons Forum and Aerospace Exposition, pp. 1-8, Jan. 5-8, 2009, Orlando, Florida.
(Continued)

*Primary Examiner* — Ted Kim
(74) *Attorney, Agent, or Firm* — Venable LLP; Edward A. Kmett; Michele V. Frank

(57) ABSTRACT

A rotating detonation combustion system is generally provided. The rotating detonation combustion system includes an outer wall, an upstream wall, and a radial wall. The outer wall is defined circumferentially around a combustor centerline extended along a lengthwise direction. The outer wall defines a first radius portion generally upstream along the outer wall. A second radius portion is defined generally downstream along the outer wall and a transition portion is defined between the first and second radius portions. The first radius portion defines a first radius greater than a second radius at the second radius portion. The transition portion defines a generally decreasing radius from the first radius portion to the second radius portion. The upstream wall is defined circumferentially around the combustor centerline and is extended along the lengthwise direction and inward radially of the first radius portion of the outer wall. An oxidizer passage is defined within the upstream wall. A combustion chamber is defined downstream of the upstream wall and radially inward of the outer wall. The radial wall is coupled to the outer wall and the upstream wall. A fluid injection opening is defined through at least one of the radial wall or the outer wall adjacent to the combustion chamber.

20 Claims, 8 Drawing Sheets

(51) Int. Cl.
*F23R 3/46* (2006.01)
*F02K 7/10* (2006.01)
*F02C 3/04* (2006.01)

(56) References Cited

U.S. PATENT DOCUMENTS

| | | | |
|---|---|---|---|
| 3,240,010 A * | 3/1966 | Morrison | F02K 9/66 60/213 |
| 3,588,298 A * | 6/1971 | Edwards | F23R 7/00 431/1 |
| 3,802,192 A * | 4/1974 | Curran | F02K 7/18 60/258 |
| 4,031,698 A * | 6/1977 | Humphrey | F02K 7/105 60/251 |
| 4,097,820 A * | 6/1978 | Hill | H01S 3/083 372/77 |
| 4,741,154 A | 5/1988 | Eidelman | |
| 5,800,153 A | 9/1998 | DeRoche | |
| 6,460,342 B1 | 10/2002 | Nalim | |
| 7,137,243 B2 | 11/2006 | Snyder et al. | |
| 7,380,503 B2 | 6/2008 | Williams et al. | |
| 7,621,118 B2 | 11/2009 | Snyder et al. | |
| 7,784,267 B2 | 8/2010 | Tobita et al. | |
| 8,082,728 B2 | 12/2011 | Murrow et al. | |
| 8,117,824 B1 | 2/2012 | Adams et al. | |
| 8,117,828 B2 | 2/2012 | Snyder et al. | |
| 8,146,371 B2 | 4/2012 | Nordeen | |
| 8,177,941 B1 | 5/2012 | Adams et al. | |
| 8,250,850 B2 | 8/2012 | Adams et al. | |
| 8,544,280 B2 | 10/2013 | Lu et al. | |
| 8,555,612 B2 | 10/2013 | Snyder et al. | |
| 8,776,493 B1 | 7/2014 | Dawson et al. | |
| 9,027,324 B2 | 5/2015 | Snyder | |
| 9,046,058 B2 | 6/2015 | Claflin | |
| 9,512,805 B2 | 12/2016 | Snyder | |
| 9,556,794 B2 | 1/2017 | Falempin et al. | |
| 9,599,065 B2 | 3/2017 | Falempin | |
| 2005/0160715 A1 | 7/2005 | Perlo et al. | |
| 2006/0260291 A1 * | 11/2006 | Vandervort | F02C 5/00 60/39.76 |
| 2010/0223933 A1 * | 9/2010 | Umeh | F02C 9/40 60/794 |
| 2011/0126511 A1 * | 6/2011 | Glaser | F02C 5/00 60/248 |
| 2014/0007837 A1 | 1/2014 | Anderson | |
| 2014/0196460 A1 | 7/2014 | Falempin et al. | |
| 2015/0167544 A1 * | 6/2015 | Joshi | F23R 7/00 123/205 |
| 2015/0285506 A1 | 10/2015 | Kasimov | |
| 2015/0308348 A1 | 10/2015 | Minick | |
| 2018/0080412 A1 * | 3/2018 | Mizener | F02C 5/02 |

FOREIGN PATENT DOCUMENTS

| | | | |
|---|---|---|---|
| CN | 104792534 A | 7/2015 | |
| CN | 204492971 U | 7/2015 | |
| CN | 104948348 A | 9/2015 | |
| CN | 103148745 B | 10/2015 | |
| CN | 104154567 B | 12/2015 | |
| CN | 104110325 B | 1/2016 | |
| CN | 105351113 A | 2/2016 | |
| DE | 102013216398 B4 | 8/2013 | |
| EP | 2261559 A1 * | 12/2010 | F23R 7/00 |
| GB | 2468515 A | 9/2010 | |
| JP | 2005133600 A | 5/2005 | |
| RU | 2242629 C1 | 12/2004 | |
| RU | 2468292 C2 | 11/2012 | |
| RU | 2573427 C2 | 1/2016 | |
| RU | 2285142 C2 | 10/2016 | |
| WO | WO2012/142485 A2 | 10/2012 | |
| WO | WO2014/129920 A1 | 8/2014 | |
| WO | WO2014/178745 A1 | 11/2014 | |
| WO | WO2014/178746 A1 | 11/2014 | |

OTHER PUBLICATIONS

Zhou et al., "Numerical investigation of flow particle paths and thermodynamic performance of continuously rotating detonation engines", Combustion and Flame, vol. 159, Issue: 12, pp. 3632-3645, Dec. 2012.

* cited by examiner

MULTI-CAN ANNULAR ROTATING DETONATION COMBUSTOR

FIELD

The present subject matter relates generally to a system of continuous detonation in a heat engine.

BACKGROUND

Many heat engines, such as gas turbine engines, are based on the Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such heat engines generally rely upon deflagrative combustion to burn a fuel/air mixture and produce combustion gas products which travel at relatively slow rates and constant pressure within a combustion chamber. While engines based on the Brayton Cycle have reached a high level of thermodynamic efficiency by steady improvements in component efficiencies and increases in pressure ratio and peak temperature, further improvements are welcomed nonetheless.

Accordingly, improvements in engine efficiency have been sought by modifying the engine architecture such that the combustion occurs as a detonation in either a continuous or pulsed mode. The pulsed mode design involves one or more detonation tubes, whereas the continuous mode is based on a geometry, typically an annulus, within which single or multiple detonation waves spin. For both types of modes, high energy ignition detonates a fuel/air mixture that transitions into a detonation wave (i.e., a fast moving shock wave closely coupled to the reaction zone). The detonation wave travels in a Mach number range greater than the speed of sound (e.g., Mach 4 to 8) with respect to the speed of sound of the reactants. The products of combustion follow the detonation wave at the speed of sound relative to the detonation wave and at significantly elevated pressure. Such combustion products may then exit through a nozzle to produce thrust or rotate a turbine.

However, heat engines, and rotating detonation combustion systems specifically, are generally designed or optimized to a specific operating condition or design point (e.g., an aero design point) at which the system is most efficient or operable. Outside or beyond such design points, a rotating detonation combustion system may be unacceptably inefficient or inoperable, such as the cell size for a fixed stoichiometry changing by approximately a factor of 20 across a range of pressures and temperatures (e.g., from a lowest operating condition to a highest operating condition), thereby limiting applications of rotating detonation combustion systems, or offsetting efficiencies of rotating detonation combustion systems at certain design points by excessive inefficiencies off design point.

Therefore, there is a need for a heat engine and rotating detonation combustion system that provides efficiency and operability across a plurality of operating conditions.

BRIEF DESCRIPTION

Aspects and advantages of the invention will be set forth in part in the following description, or may be obvious from the description, or may be learned through practice of the invention.

Embodiments of a heat engine and rotating detonation combustor (RDC) system are generally provided. The RDC system includes an outer wall, an upstream wall, and a radial wall. The outer wall is defined circumferentially around a combustor centerline extended along a lengthwise direction. The outer wall defines a first radius portion generally upstream along the outer wall. A second radius portion is defined generally downstream along the outer wall and a transition portion is defined between the first and second radius portions. The first radius portion defines a first radius greater than a second radius at the second radius portion. The transition portion defines a generally decreasing radius from the first radius portion to the second radius portion. The upstream wall is defined circumferentially around the combustor centerline and is extended along the lengthwise direction and inward radially of the first radius portion of the outer wall. An oxidizer passage is defined within the upstream wall. A combustion chamber is defined downstream of the upstream wall and radially inward of the outer wall. The radial wall is coupled to the outer wall and the upstream wall. A fluid injection opening is defined through at least one of the radial wall or the outer wall adjacent to the combustion chamber.

In one embodiment of the RDC system, the radial wall is coupled to the upstream wall and the first radius portion of the outer wall. In another embodiment, the fluid injection opening is defined through the first radius portion of the outer wall. In still another embodiment, the radial wall and the outer wall each define the fluid injection opening. The fluid injection opening provides a flow of oxidizer, a flow of fuel, or combinations thereof, to the combustion chamber. In yet another embodiment, the first radius of the first radius portion of the outer wall is between approximately 1.1 and approximately 2.0 times greater than the second radius of the second radius portion of the outer wall. In still yet another embodiment, a lengthwise distance of the transition portion of the outer wall is approximately equal to or less than two times the second radius of the second radius portion of the outer wall.

In various embodiments of the RDC system, the generally decreasing radius of the transition portion corresponds to an increasing pressure of combustion gases flowing downstream along the lengthwise direction. In one embodiment, the generally decreasing radius of the transition portion corresponds to an approximately constant velocity of combustion gases flowing downstream along the lengthwise direction.

In another embodiment of the RDC system, the transition portion defines a non-linear decrease in radius from the first radius portion to the second radius portion. In still another embodiment, the upstream wall defines the oxidizer passage as generally decreasing in cross sectional area downstream along the lengthwise direction.

Another aspect of the present disclosure is directed to a heat engine including one or more embodiments of the RDC system. The heat engine defines a longitudinal centerline extended therethrough for reference purposes. The heat engine includes an inlet section through which an oxidizer is admitted into the heat engine and an exhaust section through which combustion products expand and exit the heat engine. The RDC system is disposed in serial arrangement between the inlet section and the exhaust section. The RDC system is configured to produce combustion products from the oxidizer and a flow of fuel.

In various embodiments of the heat engine, a plurality of the combustor centerline of the rotating detonation combustion system is disposed in an adjacent circumferential arrangement around the longitudinal centerline of the heat engine. The combustor centerline is disposed at an acute angle relative to the longitudinal centerline. In another embodiment of the heat engine, the combustor centerline of the rotating detonation combustion system is disposed at a tangent angle relative to the longitudinal centerline of the heat engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
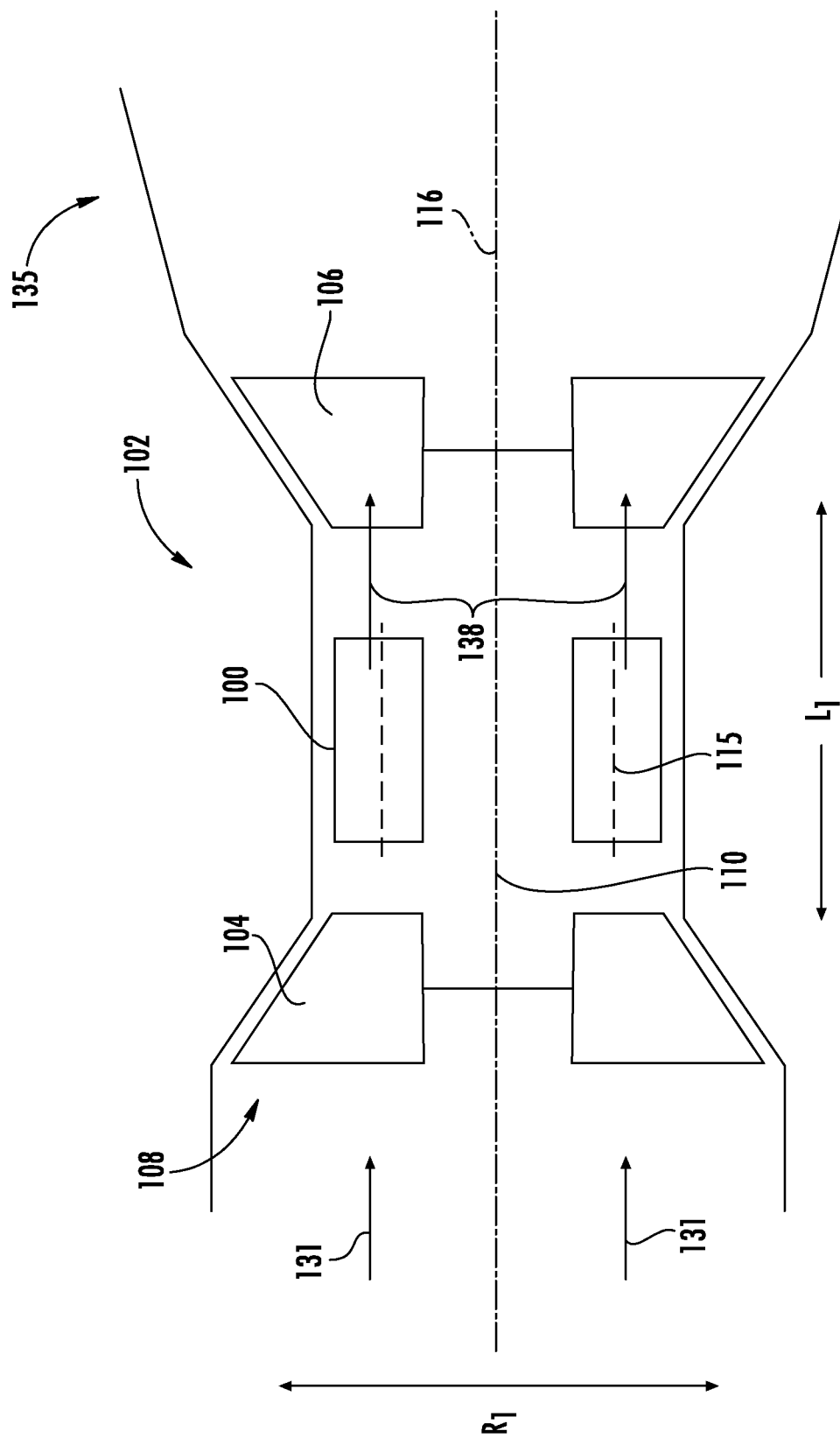
FIG. 1 is a schematic view of a heat engine in accordance with an exemplary embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "forward" and "aft" refer to relative positions within a heat engine or vehicle, and refer to the normal operational attitude of the heat engine or vehicle. For example, with regard to a heat engine, forward refers to a position closer to a heat engine inlet and aft refers to a position closer to a heat engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, "detonation" and "quasi-detonation" may be used interchangeably. Typical embodiments of rotating detonation combustion systems include a means of igniting a fuel/oxidizer mixture (e.g., a fuel/air mixture) and a confining detonation or combustion chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation via cross-firing. The geometry of the detonation chamber is such that the pressure rise of the detonation wave expels combustion products out of a detonation chamber exhaust (e.g., downstream end) to produce a thrust force. In addition, rotating detonation combustors are designed such that a substantially continuous detonation wave is produced and discharged therefrom. As known to those skilled in the art, detonation may be accomplished in a number of types of detonation chambers, including detonation tubes, shock tubes, resonating detonation cavities, and annular detonation chambers.

Embodiments of a rotating detonation combustion system (RDC system) are generally provided that may provide improved efficiency and operability across a plurality of operating conditions. The embodiments of the RDC system generally provided herein define a rearward facing step providing an oblique shockwave from detonation of the fuel-oxidizer mixture within the combustion chamber. The embodiments of the RDC system shown and described herein may provide mass throughput rates in relatively large heat engines while further providing a generally stabilized detonation within the RDC system. The mass throughput levels generally provided by the embodiments of the RDC system shown and described herein may be approximately equal to or greater than those of similarly sized, or larger, annular deflagrative combustor configurations.

Referring now to the figures, FIG. 1 depicts a heat engine including a rotating detonation combustion system 100 (an "RDC system") in accordance with an exemplary embodiment of the present disclosure. For the embodiment of FIG. 1, the heat engine 102 generally includes an inlet section 104 and an exhaust section 106, with the RDC system 100 located downstream of the inlet section 104 and upstream of the exhaust section 106. The heat engine 102 defines a longitudinal direction L1 generally co-linear to a longitudinal centerline 116 extended through the heat engine 102 provided for illustrative purposes. The heat engine 102 further defines a radial direction R1 extended from the longitudinal centerline 116. In various embodiments, the heat engine 102 defines a gas turbine engine, a ramjet, or other a propulsion system generally including a fuel-oxidizer burner producing combustion products that provide propulsive thrust or mechanical energy output. In an embodiment of the heat engine 102 defining a gas turbine engine, the inlet section 104 includes a compressor section defining one or more compressors generating a flow of oxidizer to the RDC system 100. The inlet section 104 may generally guide a flow of the oxidizer 131 to the RDC system 100. The inlet section 104 may further compress the oxidizer before it enters the RDC system 100. The inlet section 104 defining a compressor section may include one or more alternating stages of rotating compressor airfoils. In other embodiments, the inlet section 104 may generally define a decreasing cross sectional area from an upstream end to a downstream end proximate to the RDC system 100.

As will be discussed in further detail below, at least a portion of the flow of oxidizer is mixed with a liquid or gaseous fuel 133 (or combinations thereof) to generate combustion products 138. The combustion products 138 flow downstream to the exhaust section 106. In various embodiments, the exhaust section 106 may generally define an increasing cross sectional area from an upstream end proximate to the RDC system 100 to a downstream end of the heat engine 102. Expansion of the combustion products 138 generally provides thrust that propels the apparatus to which the heat engine 102 is attached, or provides mechanical energy to one or more turbines further mechanically or aerodynamically coupled to a fan or propeller section, a power turbine, a generator, or combinations thereof. Thus, the exhaust section 106 may further define a turbine section of a gas turbine engine including one or more alternating rows or stages of rotating turbine airfoils. The combustion products 138 may flow from the exhaust section 106 through, e.g., an exhaust nozzle 135 to generate thrust for the heat engine 102.

As will be appreciated, in various embodiments of the heat engine 102 defining a gas turbine engine, rotation of the turbine(s) within the exhaust section 106 generated by the combustion products is transferred through one or more shafts or spools 110 to drive the compressor(s) within the inlet section 104. In various embodiments, the inlet section 104 may further define a fan section, such as for a turbofan engine configuration, such as to propel air across a bypass flowpath outside of the RDC system 100 and exhaust section 106. The combustion products may then flow from the exhaust section 106 through, e.g., an exhaust nozzle 135 to generate thrust for the heat engine 102.

It will be appreciated that the heat engine 102 depicted schematically in FIG. 1 is provided by way of example only. In certain exemplary embodiments, the heat engine 102 may include any suitable number of compressors within the inlet section 104, any suitable number of turbines within the exhaust section 106, and further may include any number of shafts or spools 110 appropriate for mechanically linking the compressor(s), turbine(s), and/or fans. Similarly, in other exemplary embodiments, the heat engine 102 may include any suitable fan or propeller section, with a fan or propeller thereof being driven by the exhaust section 106 in any suitable manner. For example, in certain embodiments, the fan may be directly linked to a turbine within the exhaust section 106, or alternatively, may be driven by a turbine within the exhaust section 106 across a reduction gearbox. Additionally, the fan or propeller may be a variable pitch fan, a fixed pitch fan, a ducted fan (i.e., the heat engine 102 may include an outer nacelle surrounding the fan section), an un-ducted fan, or may have any other suitable configuration.

Moreover, it should also be appreciated that the RDC system 100 may further be incorporated into any other suitable aeronautical propulsion system, such as a turbofan engine, a turboshaft engine, a turboprop engine, a turbojet engine, a ramjet engine, a scramjet engine, etc. Further, in certain embodiments, the RDC system 100 may be incorporated into a non-aeronautical propulsion system, such as a land-based or marine-based power generation system. Further still, in certain embodiments, the RDC system 100 may be incorporated into any other apparatus, such as a rocket or missile engine. With one or more of the latter embodiments, the propulsion system may not include a compressor in the inlet section 104 or a turbine in the exhaust section 106.

Referring now to FIGS. 2-6, exemplary embodiments of the heat engine 102 including the RDC system 100 are generally provided. The RDC system 100 may generally define a can-annular configuration RDC system. For example, the RDC system 100 defines a combustor centerline 115 extended through an outer wall 118 defining a combustion can. The outer wall 118 is defined circumferentially around the combustor centerline 115 and extended along a lengthwise direction L2 relative to the RDC system 100. As such, the outer wall 118 may define a combustion can. In various embodiments, a plurality of the outer wall 118 may be arranged in an adjacent circumferential arrangement around the longitudinal centerline 116 of the heat engine 102 (FIG. 1). Additionally, a plurality of the combustor centerline 115 may be arranged in an adjacent circumferential arrangement around the longitudinal centerline 116. For example, in one embodiment, the combustor can be defined by the outer wall 118 may be in adjacent circumferential arrangement around the longitudinal centerline 116 of the heat engine 102, such as generally provided in FIGS. 1, 7, and 8.

In various embodiments further discussed herein, the combustion cans defined around each combustor centerline 115 may be disposed at acute and/or tangential angles relative to the longitudinal centerline 116 of the heat engine 102. The longitudinal direction L2 is disposed relative to the combustor centerline 115, such as co-directional thereto. In one embodiment, such as generally provided in FIG. 1, the longitudinal direction L2 may be co-directional to the longitudinal direction L1 relative to the longitudinal centerline 116 of the heat engine 102. However, in other embodiments further described herein, the longitudinal direction L2 may be disposed differently relative to the longitudinal direction L1.

A portion of the heat engine 102 forward of (i.e., toward a forward end 99) the RDC system 100 further includes an upstream wall 120 defined circumferentially around the combustor centerline 115. The upstream wall 120 is further extended along the lengthwise direction L2 and inward radially of the first radius portion 127 of the outer wall 118. The upstream wall 120 is defined generally upstream of the outer wall 118. In various embodiments, the upstream wall 120 is a portion of the inlet section 104. An oxidizer passage 114 is defined radially within the upstream wall 120 through which a flow of oxidizer 131 is provided to a combustion chamber 122. The oxidizer passage 114 is defined annularly around the combustor centerline 115. The combustion chamber 122 is defined downstream (e.g., toward the aft end 98) of the upstream wall 120 and radially inward of the outer wall 118. The oxidizer passage 114 is in fluid communication with the combustion chamber 122.

In various embodiments, the outer wall 118 is extended at least partially along the lengthwise direction L2 around the combustor centerline 115. In one embodiment, the outer wall 118 defines a first radius portion 127, a second radius portion 129, and a transition portion 128 therebetween. Referring briefly to the exemplary schematic axial view embodiments generally provided in FIGS. 3-6, the first radius portion 127 defines a first radius 147 relative to the combustor centerline 115 greater than a second radius 149 relative to the combustor centerline 115 at the second radius portion 129. The transition portion 128 defines a generally decreasing radius relative to the combustor centerline 115 from the first radius portion 127 to the second radius portion 129.

Referring back to FIGS. 2-6, in various embodiments, the first radius portion 127 is defined generally upstream or forward along the outer wall 118. Additionally, the second radius portion 129 is defined generally downstream or aft along the outer wall 118. The first radius portion 127 is defined generally forward or upstream (i.e., toward the forward end 99) of the transition portion 128 and the second radius portion 129 of the outer wall 118. Alternatively, the second radius portion 129 is defined generally aft or downstream (i.e., toward the aft end 98) of the transition portion 128 and the first radius portion 127 of the outer wall 118. In various embodiments, the outer wall 118 may be coupled to the exhaust section 106 of the heat engine 102. More specifically, in one embodiment, such as generally provided in FIG. 3, the second radius portion 129 of the outer wall 118 is coupled to the exhaust section 106. As such, the RDC system 100, or more specifically, the outer wall 118, may define a rearward facing step from the first radius portion 127 to the second radius portion 129.

Referring still to FIGS. 2-6, the RDC system 100 further includes a radial wall 117 coupled to the outer wall 118 and the upstream wall 120. The radial wall 117 may extend at least partially along a radial direction R2 extended perpendicular from the combustor centerline 115. In one embodiment, the radial wall 117 is more specifically coupled to the upstream wall 117 and the first radius portion 127 of the outer wall 118.

In various embodiments, a fluid injection opening 162 is defined through at least the radial wall 117 or the outer wall 118. The fluid injection opening 162 provides fluid communication through the radial wall 117 or the outer wall 118 to the combustion chamber 122. In one embodiment, the fluid injection opening 162 defines one or more discrete openings through the radial wall 117 and/or the outer wall 118. For example, the fluid injection opening 162 may define an orifice. The orifice may define a circular, ovular or elliptical, rectangular, polygonal, or oblong cross sectional area through the radial wall 117 and/or the outer wall 118. In various embodiments further described herein, a flow of oxidizer, a flow of liquid or gaseous fuel, or combinations thereof (i.e., fuel-oxidizer mixtures) are provided to the combustion chamber 122. The fluid injection opening 162 is generally defined adjacent to the combustion chamber 122 defined inward of the outer wall 118.

Figure 2:
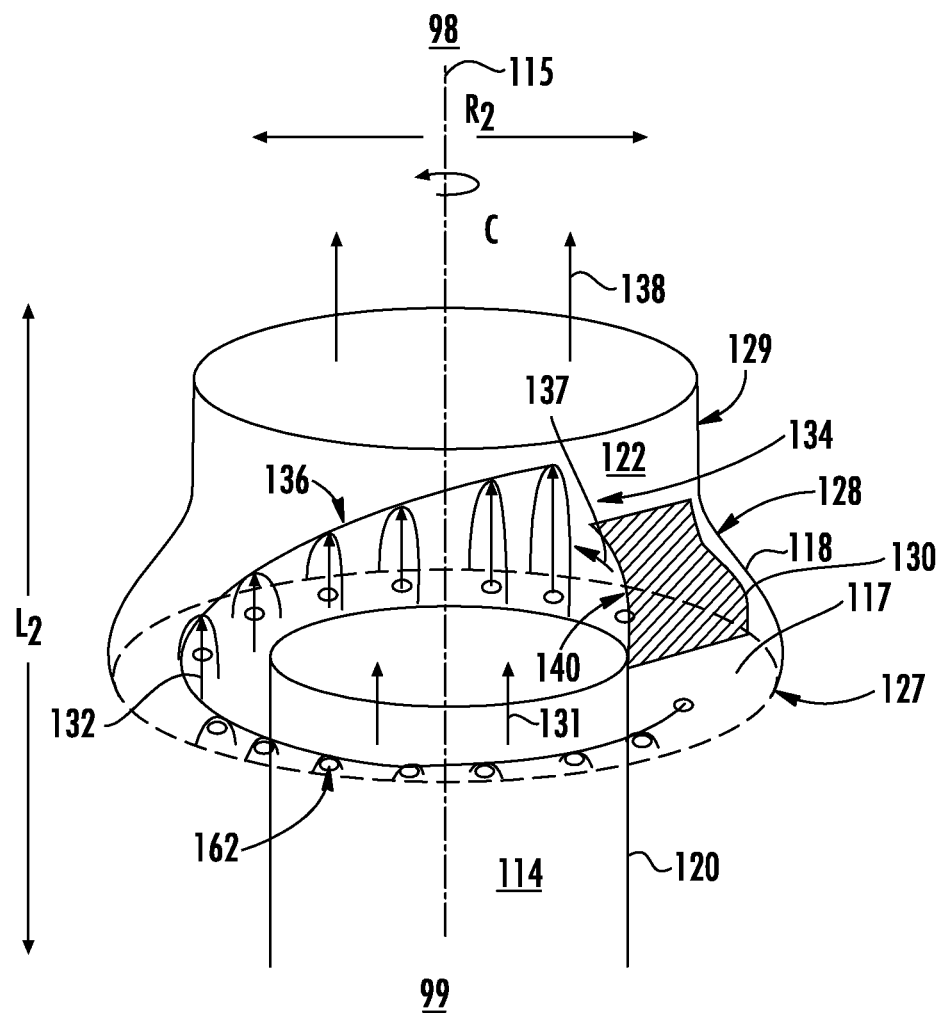
FIG. 2 is a perspective view of an exemplary rotating detonation combustion system of the heat engine of FIG. 1.

Referring now to FIG. 2, a perspective view of an exemplary embodiment of the RDC system 100 is generally provided. During operation of the heat engine 102 (FIG. 1), the flow of oxidizer 131 enters the RDC system 100. A portion of the flow of oxidizer 131 is provided to the combustion chamber 122 through the oxidizer passage 114. A flow of fuel-oxidizer mixture 132 is deposited into the combustion chamber 122 through one or more fluid injection openings 162, such as described in regard to FIG. 3, and in further exemplary embodiments in reference to FIGS. 4-6. In the embodiment generally provided in FIG. 2, the fuel-oxidizer mixture 132 flows downstream through the radial wall 117 into the combustion chamber 122 and detonates to yield combustion gases 138. Detonation of the fuel-oxidizer mixture 132 generates a detonation wave 130 that travels generally along a circumferential direction C relative to the combustor centerline 115, such as shown schematically at arrow 137, and consuming an envelope 136 of incoming fuel-oxidizer mixture 132, thereby generating a high pressure region 134 downstream of the detonation wave 130. The detonation wave 130 at the combustion chamber 122 defined inward of the transition portion 128 of the outer wall 118 defines an oblique shockwave 140 stabilized in the combustion chamber 122 within the transition portion 128.

The detonation wave 130 is a shock induced flame that results in a coupling of a reaction zone and a shockwave. The shockwave compresses and heats the fresh fuel-oxidizer mixture 132, thereby increasing the fuel-oxidizer mixture 132 above a self-ignition point. Energy released by the detonation of the fuel-oxidizer mixture 132 contributes to the propagation of the detonation shockwave 130. Furthermore, with continuous detonation, the detonation wave 130 propagates around the combustion chamber 122 in a continuous manner and defining a generally oblique shockwave 140 while operating at a relatively high frequency. Additionally, the detonation wave 130 may be such that an average pressure inside the combustion chamber 122 is higher than an average pressure within typical combustion systems (i.e., deflagration combustion systems). The flow of oxidizer 131 through the oxidizer passage 114 dilutes and pressurizes the combustion gases 138 to further produce the oblique shockwave 140 in the combustion chamber 122.

The oblique shockwaves 140 in the RDC system 100 generally define shockwaves at angles less than approximately 90 degrees relative to the direction of flow of the oxidizer 131 and combustion products 138 (e.g., direction of flow along the longitudinal direction L2). The oblique shockwave 140 may be preferable in contrast to normal shockwaves (e.g., normal or perpendicular to the direction of flow of the combustion products 138). For example, the oblique shockwave 140 may provide a smaller increase in entropy and reduced stagnation pressure loss.

The generally decreasing radius of the transition portion 128 of the outer wall 118 corresponds to an increasing pressure of the combustion gases 138 produced by the detonation wave 130. Furthermore, the generally decreasing radius of the transition portion 128 corresponds to an approximately constant velocity of combustion gases 138 flowing downstream along the lengthwise direction L. As such, the RDC system 100 described herein may provide a robust, repeatable, and reproducible detonation wave 130 that may meet mass throughput rates for the heat engine 102. Additionally, the generally decreasing radius of the transition portion 128 of the outer wall 118 may provide a feature such that the detonation wave 130 produces the oblique shockwave 140.

It should be appreciated that that FIG. 2 includes representations of the oblique shockwave 140 and detonation wave 130 for illustrative purposes. The structure of the oblique shockwave 140, the detonation wave 130, or both, may vary based on propagation of the detonation wave 130 along the circumferential direction C, the envelope 136 of fuel-oxidizer mixture 132 to the combustion chamber 122, the flow of oxidizer 131, or combinations thereof.

Referring now to FIGS. 3-6, axial schematic views of exemplary embodiments of the heat engine 102 and RDC system 100 are generally provided. In one embodiment, such as generally provided in FIG. 3, the fluid injection opening 162 is defined through the radial wall 117. A flow of a fuel-oxidizer mixture 132 is deposited into the combustion chamber 122 through the fluid injection opening 162 defined through the radial wall 117. In various embodiments, the flow of fuel-oxidizer mixture 132 may generally define a premixed flow of liquid or gaseous fuel and oxidizer.

Figure 4:
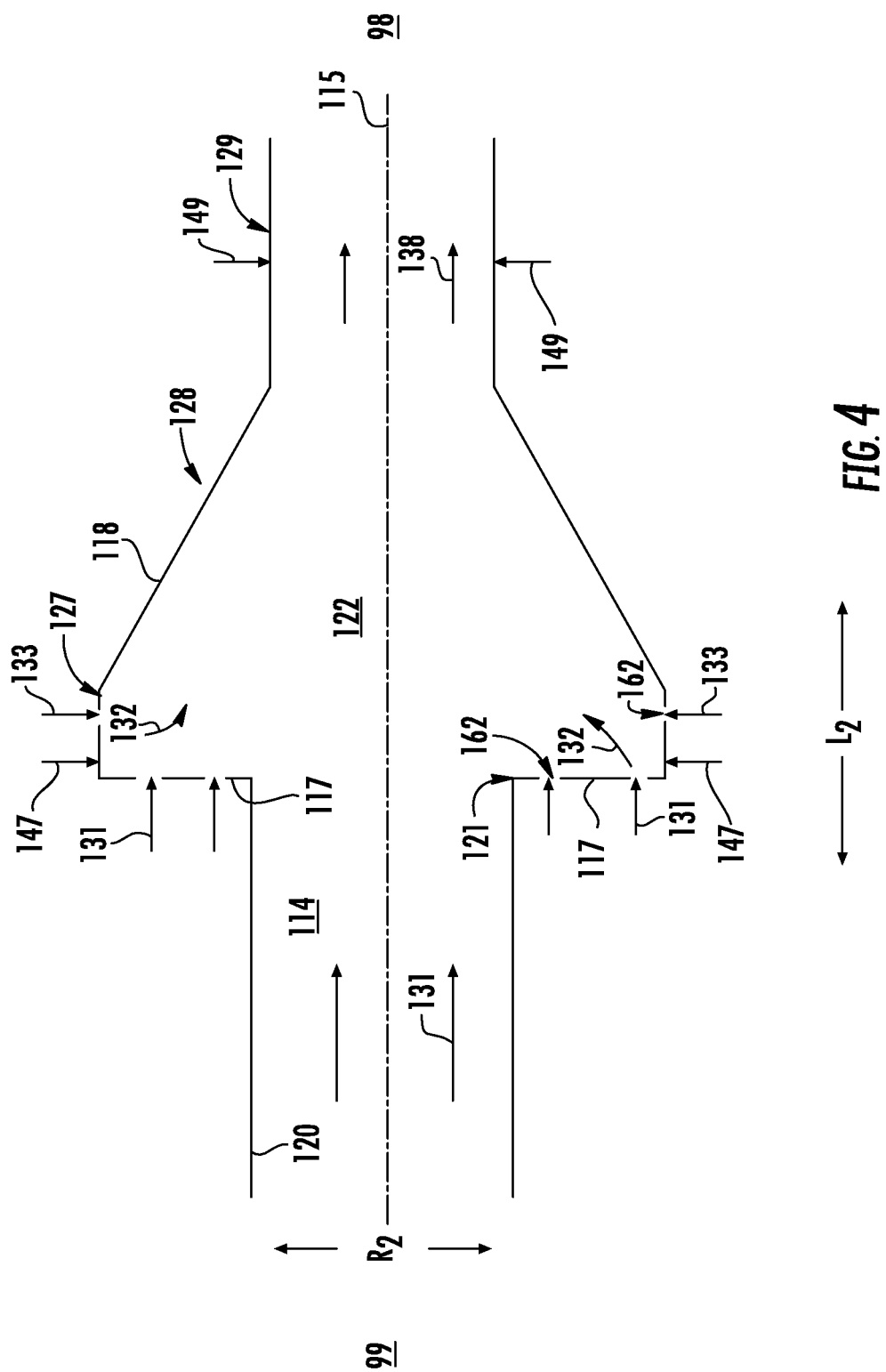

Referring now to FIG. 4, in another embodiment, the fluid injection opening 162 is defined through the radial wall 117 to provide a flow of oxidizer 131 to the combustion chamber 122. The fluid injection opening 162 is further defined through the outer wall 118 to provide a flow of fuel 133 to the combustion chamber 122. The flow of oxidizer 131 and the flow of fuel 133 are each mixed together at the combustion chamber 122 and detonated, such as further described herein.

Figure 3:
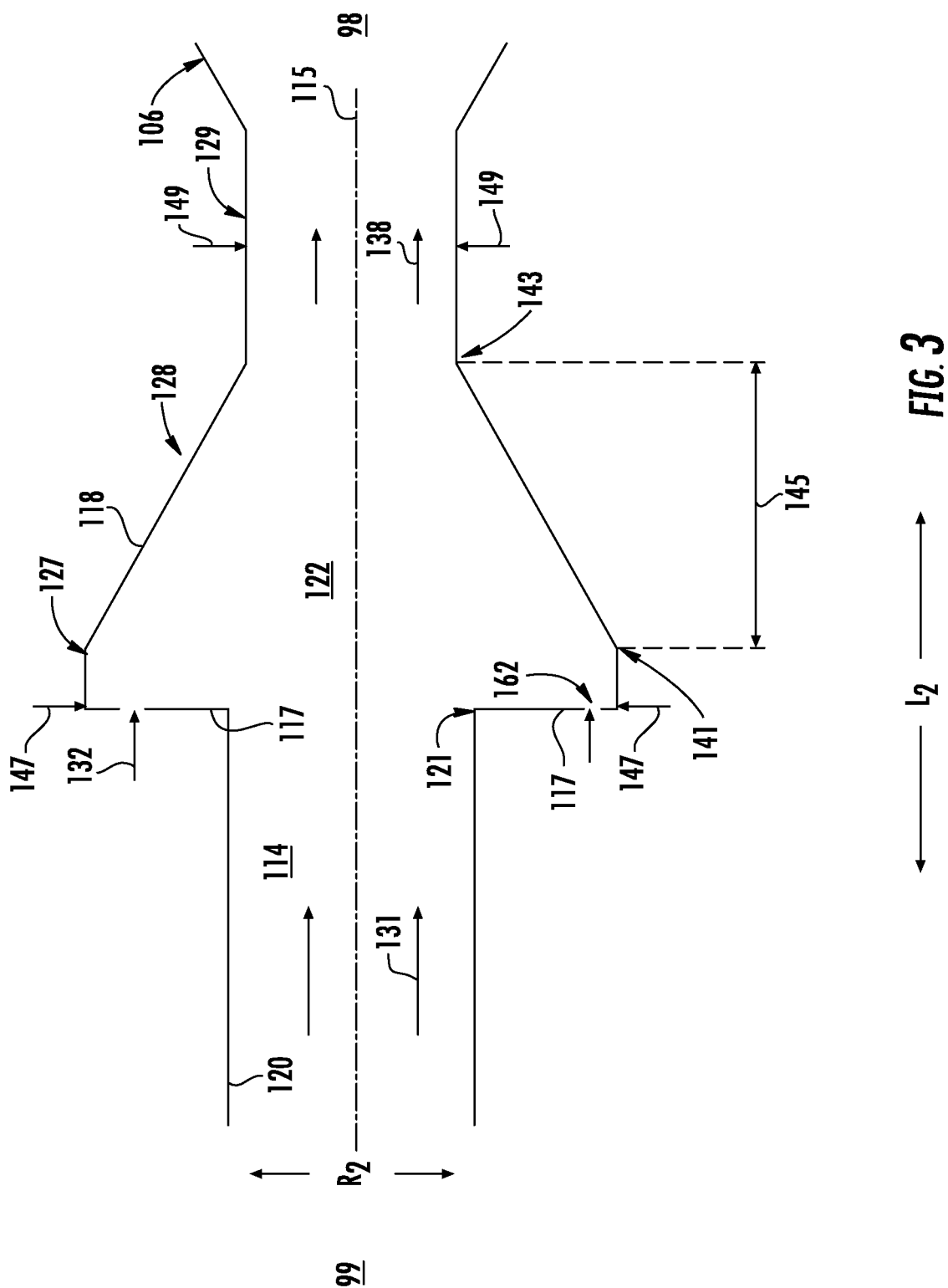
FIGS. 3-6 are axial views of exemplary rotating detonation combustion systems of the heat engine of FIG. 1.
Figure 5:
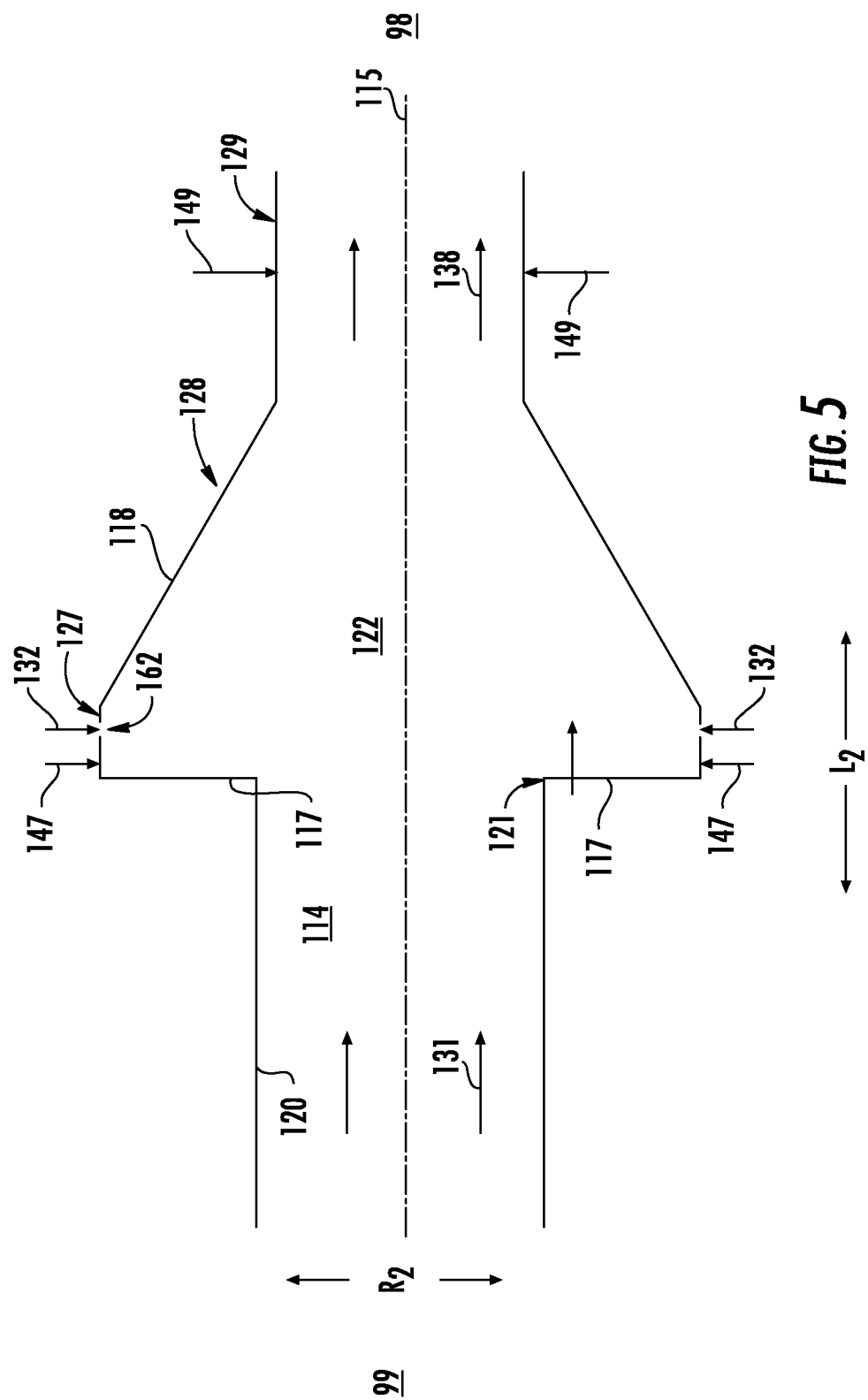

Referring now to FIG. 5, in yet another embodiment, the fluid injection opening 162 is defined through the outer wall 118 to provide a premixed flow of fuel-oxidizer mixture 132 to the combustion chamber 122, such as described in regard to FIG. 3.

Figure 6:
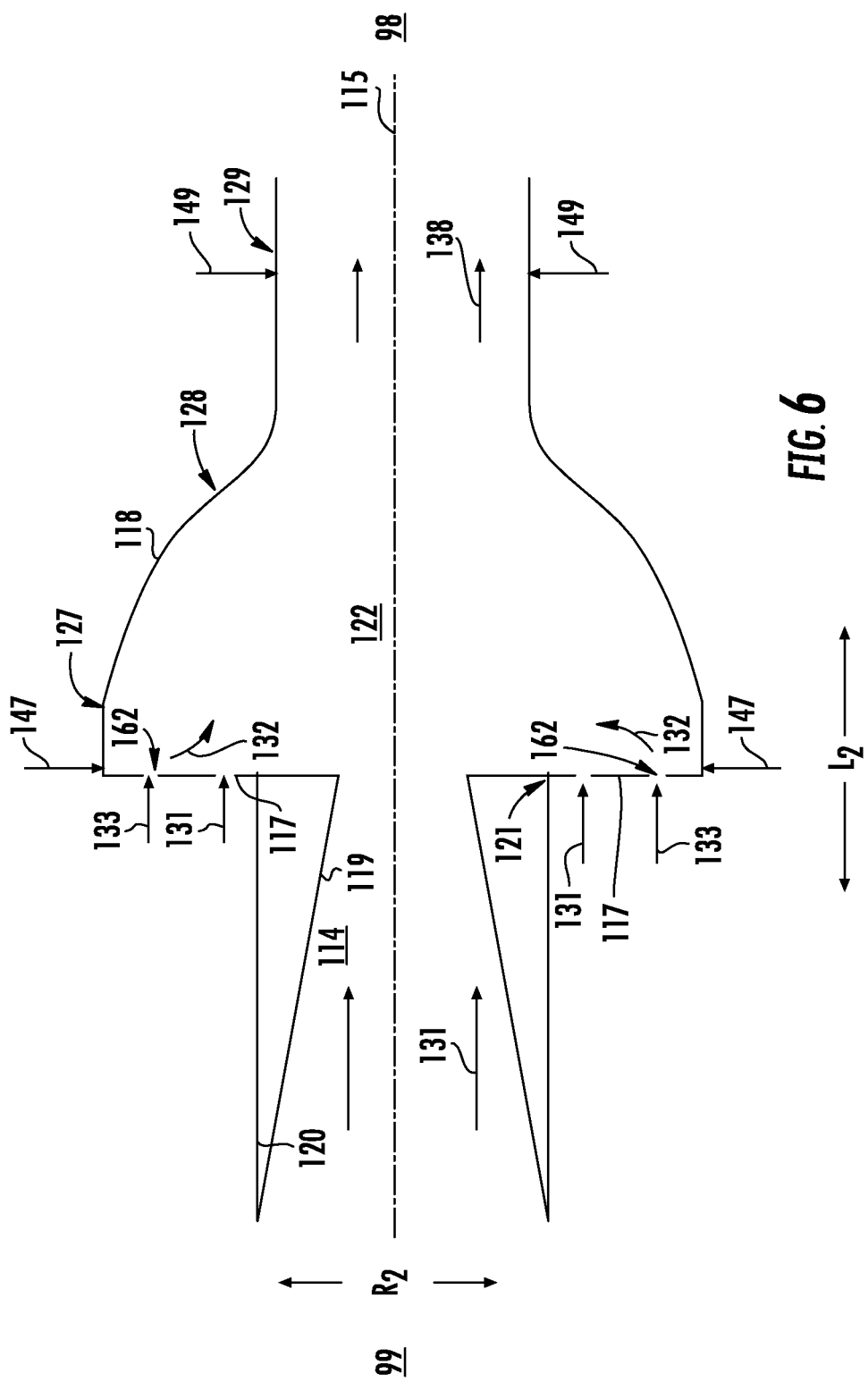

Referring now to FIG. 6, in still yet another embodiment, the fluid injection openings 162 may be defined through the radial wall 117 to provide separate flows of fuel 133 and oxidizer 131 through the radial wall 117 to the combustion chamber 122. The flows of fuel 133 and oxidizer 131 are then mixed and detonated in the combustion chamber 122, such as described in regard to FIG. 4.

In still various embodiments, a plurality of the fluid injection openings 162 may be defined through the outer wall 118 such as to provide separate flows of oxidizer 131 and fuel 133 therethrough to the combustion chamber 122, such as described in regard to FIG. 6.

Referring back to FIGS. 2-6, in various embodiments, the RDC system 100 may define the first radius 147 of the first radius portion 127 of the outer wall 118 between approximately 1.1 and approximately 2.0 times greater than the second radius 149 of the second radius portion 129 of the outer wall 118. In still various embodiments, the transition portion 128 is extended within a lengthwise distance 145 (FIG. 3) along the lengthwise direction L2. The lengthwise distance 145 of the transition portion 128 may correspond to a distance along the lengthwise direction L2 from the first radius portion 127 to the second radius portion 129 of the outer wall 118. For example, referring to FIG. 3, the first radius portion 127 may define a downstream-most end 141, such as a reference plane extended perpendicular from the combustor centerline 115 along the radial direction R2, at which the first radius portion 127 is coupled to the transition portion 128. The second radius portion 129 may define an upstream-most end 143, such as a reference plane extended perpendicular from the combustor centerline 115 along the radial direction R2, at which the second radius portion 129 is coupled to the transition portion 128. The lengthwise distance 145 may be defined from the downstream-most end 141 of the first radius portion 127 to the upstream-most end 143 of the second radius portion 129.

In one embodiment, the lengthwise distance 145 of the transition portion 128 of the outer wall 118 is approximately equal to or less than 2.0 times the second radius 149 of the second radius 129 portion of the outer wall 118. Stated alternatively, the lengthwise distance 145 of the transition portion 128 may be quantified as approximately two times or less of the quantity of the second radius 149 of the second radius portion 129. In various embodiments, such as generally provided in FIGS. 2-4, the transition portion 128 of the outer wall 118 may define a generally linear decrease in radius along the lengthwise direction L2 from the first radius portion 127 to the second radius portion 129. For example, the transition portion 128 may define a slope based at least in part on the lengthwise distance 145 of the transition portion 128 and the range of relative radii of the first radius 147 relative to the second radius 149.

Referring now to FIG. 6, in another embodiment, the transition portion 128 of the outer wall 118 may generally define a non-linear decrease in radius along the lengthwise direction L from the first radius portion 127 to the second radius portion 129. For example, the transition portion 128 may define an exponential decrease in radius downstream along the lengthwise direction L2 (i.e., toward the aft end 98) from the first radius portion 127 to the second radius portion 129.

Referring still to FIG. 6, the oxidizer passage 114 defined within the upstream wall 120 may define a generally decreasing cross sectional area along the downstream direction. For example, the upstream wall 120 may define the oxidizer passage 114 as a frusto-conical volume. In various embodiments, the upstream wall 120 may define an inner upstream wall 119 at least partially converging toward the combustor centerline 115 such as to define a generally decreasing cross sectional area along the downstream direction. As such, the inner upstream wall 119 of the upstream wall 120 may define a generally decreasing cross sectional area along the downstream direction.

However, in other embodiments, the inner upstream wall 119 may define an increasing cross sectional area along the downstream direction. In still various embodiments, the inner upstream wall 119 may define a convergent-divergent nozzle, such as to define an upstream portion decreasing in cross sectional area and a downstream portion increasing in cross sectional area.

Figure 7:
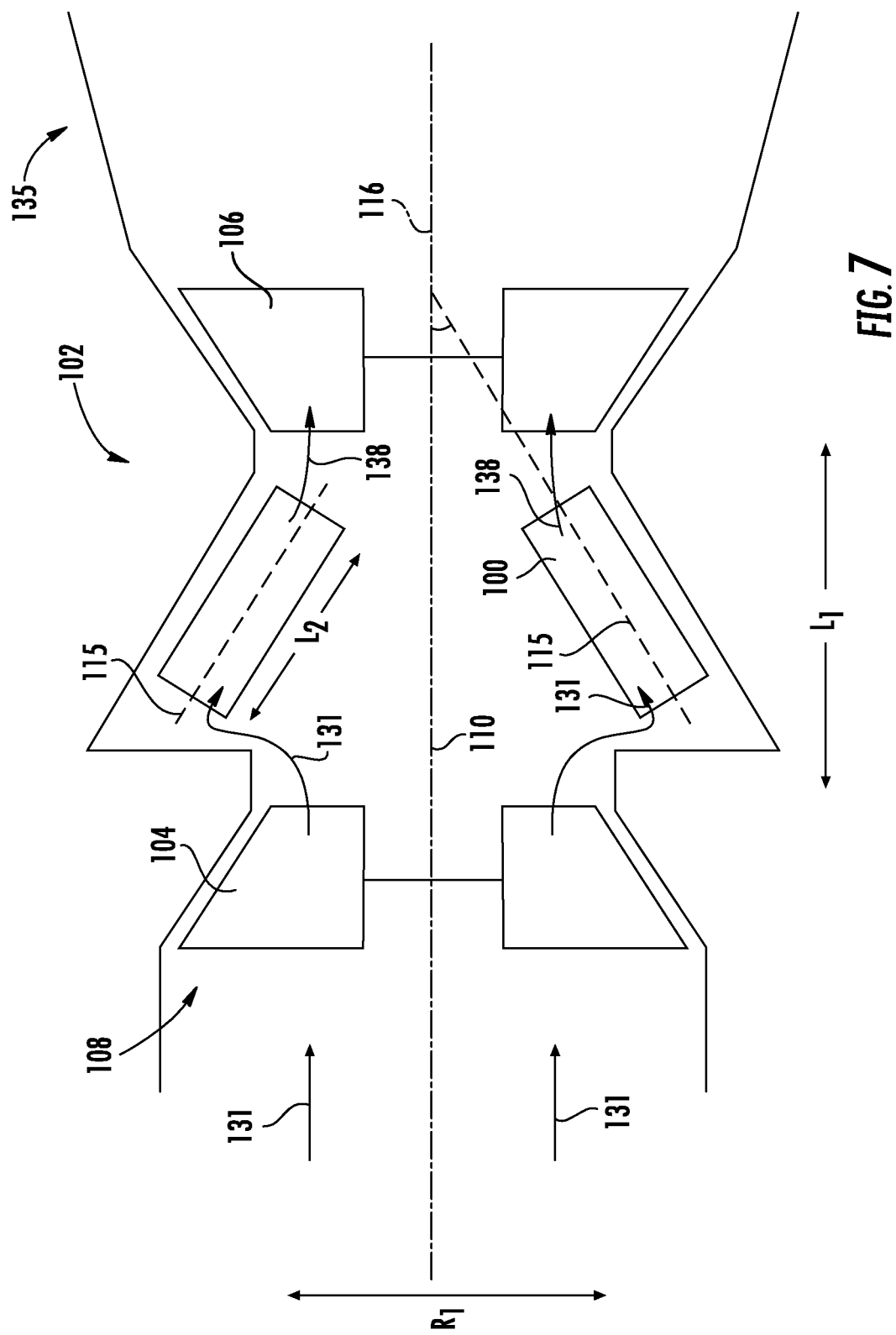
FIG. 7 is a schematic view of another exemplary embodiment of a heat engine according to an aspect of the present disclosure.

Referring now to FIG. 7, another exemplary embodiment of the heat engine 102 is generally provided. The heat engine 102 generally provided in FIG. 7 may be configured substantially similarly as described in regard to FIGS. 1-6. However, in FIG. 7, the RDC system 100 may be canted or disposed at an acute angle relative to the longitudinal centerline 116 of the heat engine 102. For example, in various embodiments, the combustor centerline 115 is defined at an acute angle relative to the longitudinal centerline 116, such as to dispose the outer wall 118, the upstream wall 120, and the passages and chambers 114, 122, 124 defined therebetween generally at an angle relative to the longitudinal centerline 116. In various embodiments, the RDC system 100 may be disposed between approximately 3 degrees and approximately 87 degrees relative to the longitudinal centerline 116. In other embodiments, the RDC system 100 may be disposed within approximately 30 degrees greater than or approximately 30 degrees less than approximately 45 degrees relative to the longitudinal centerline 116.

Figure 8:
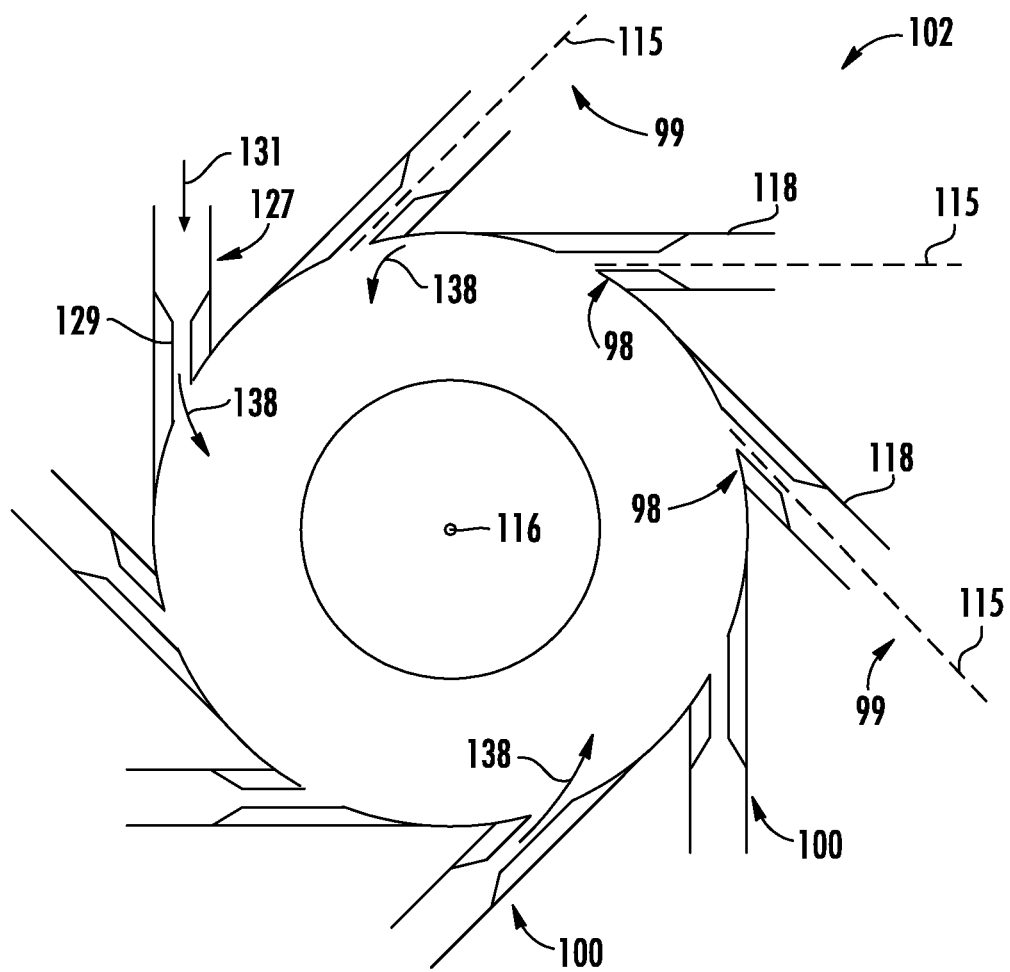
FIG. 8 is side view of yet another exemplary embodiment of a heat engine according to an aspect of the present disclosure.

Referring now to FIG. 8, yet another exemplary embodiment of the heat engine 102 is generally provided. The heat engine 102 generally provided in FIG. 8 may be configured substantially similarly as described in regard to FIG. 7. However, in FIG. 8, the RDC system 100 may further be disposed at an angle tangent to the longitudinal centerline 116 of the heat engine 102. For example, the tangential arrangement of the plurality of RDC systems 100 may provide a bulk swirl of the combustion products 138 entering the exhaust section 106 (shown in FIGS. 1 and 7). The bulk swirl of the combustion products 138 may reduce a chord length of a turbine nozzle (e.g., first stage nozzle disposed between the combustion chamber 122 and a rotor of the exhaust section 106 defining a turbine section). A reduced chord length may further reduce an amount of oxidizer removed from the combustion process that is utilized for cooling of the turbine nozzle or other components of the exhaust section 106. In various embodiments, the bulk swirl of the combustion products 138 may eliminate a need for the turbine nozzle, thereby further improving heat engine 102 efficiency by reducing the amount of oxidizer removed from mixture with fuel and detonation in the combustion chamber 122.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotating detonation combustion system, comprising:
    an outer wall defined circumferentially around a combustor centerline extended along a lengthwise direction, wherein the outer wall defines a first radius portion extended along the lengthwise direction generally upstream along the outer wall, a second radius portion extended along the lengthwise direction generally downstream along the outer wall, and a transition portion extended along the lengthwise direction therebetween, wherein the first radius portion defines a first radius greater than a second radius at the second radius portion, and wherein the transition portion defines a generally decreasing radius extending along the lengthwise direction from the first radius portion to the second radius portion;
    an upstream wall defined circumferentially around the combustor centerline and extended along the lengthwise direction and inward radially of the first radius portion of the outer wall, wherein an oxidizer passage is defined within the upstream wall, and
    wherein a combustion chamber is configured for rotating detonation by combusting fuel and oxidizer and is defined downstream of the upstream wall and radially inward of the outer wall,
    wherein the combustor centerline extends through and along the oxidizer passage, the oxidizer passage providing a flow of oxidizer directly into the combustion chamber along the combustor centerline;
    a radial wall coupled to the outer wall and the upstream wall; and
    multiple fluid injection openings positioned about the combustor centerline and the flow of the oxidizer, the multiple fluid injections openings being defined through at least one of the radial wall or the outer wall adjacent to the combustion chamber.

2. The rotating detonation combustion system of claim 1, wherein the radial wall is coupled to the upstream wall and the first radius portion of the outer wall.

3. The rotating detonation combustion system of claim 1, wherein the multiple fluid injection openings are defined through the first radius portion of the outer wall.

4. The rotating detonation combustion system of claim 1, wherein the radial wall and the outer wall each define the multiple fluid injection openings, and
    wherein the multiple fluid injection openings provide a flow of oxidizer, a flow of fuel, or combinations thereof, to the combustion chamber.

5. The rotating detonation combustion system of claim 1, wherein the first radius of the first radius portion of the outer wall is between approximately 1.1 and approximately 2.0 times greater than the second radius of the second radius portion of the outer wall.

6. The rotating detonation combustion system of claim 1, wherein a lengthwise distance of the transition portion of the outer wall is between being equal to the second radius of the second radius portion of the outer wall and two times the second radius of the second radius portion of the outer wall.

7. The rotating detonation combustion system of claim 1, wherein the generally decreasing radius of the transition portion corresponds to an increasing pressure of combustion gases flowing downstream along the lengthwise direction.

8. The rotating detonation combustion system of claim 7, wherein the generally decreasing radius of the transition portion corresponds to an approximately constant velocity of combustion gases flowing downstream along the lengthwise direction.

9. The rotating detonation combustion system of claim 1, wherein the transition portion defines a non-linear decrease in radius from the first radius portion to the second radius portion.

10. The rotating detonation combustion system of claim 1, wherein the upstream wall defines the oxidizer passage as generally decreasing in cross sectional area downstream along the lengthwise direction.

11. The rotating detonation combustion system of claim 1, wherein the multiple fluid injection openings are positioned about the combustor centerline to provide respective flows of fuel and/or oxidizer that form an envelope surrounding the flow of oxidizer by the oxidizer passage.

12. The rotating detonation combustion system of claim 1, wherein the outer wall defines a combustion can.

13. The rotating detonation combustion system of claim 1, wherein the combustion chamber is configured to produce a substantially continuous oblique detonation wave that travels around the combustion centerline, and
    wherein the flow of oxidizer by the oxidizer passage dilutes and/or pressurizes combustion gases to further produce the continuous oblique detonation wave.

14. A heat engine defining a longitudinal centerline extended therethrough, the heat engine comprising:
    an inlet section through which an oxidizer is admitted into the heat engine;
    an exhaust section through which combustion products expand and exit the heat engine; and
    a rotating detonation combustion system disposed in serial arrangement between the inlet section and the exhaust section, the rotating detonation combustion system configured to produce combustion products from the oxidizer and a flow of fuel, the rotating detonation combustion system comprising:
        an outer wall defined circumferentially around a combustor centerline extended along a lengthwise direction, wherein the outer wall defines a first radius portion extended along the lengthwise direction generally upstream along the outer wall, a second radius portion extended along the lengthwise direction generally downstream along the outer wall, and a transition portion extended along the lengthwise direction therebetween, wherein the first radius portion defines a first radius greater than a second radius at the second radius portion, and wherein the transition portion defines a generally decreasing radius extended along the lengthwise direction from the first radius portion to the second radius portion;
        an upstream wall defined circumferentially around the combustor centerline and extended along the lengthwise direction and inward radially of the first radius portion of the outer wall, wherein an oxidizer passage is defined within the upstream wall, and
        wherein a combustion chamber is configured for rotating detonation by combusting fuel and oxidizer and is defined downstream of the upstream wall and radially inward of the outer wall, wherein the combustor centerline extends through and along the oxidizer passage, the oxidizer passage providing a flow of oxidizer directly into the combustion chamber along the combustor centerline;

a radial wall coupled to the outer wall and the upstream wall; and multiple fluid injection openings positioned about the combustor centerline, the fluid injections openings being defined through at least one of the radial wall or the outer wall adjacent to the combustion chamber.

15. The heat engine of claim 14, wherein the radial wall of the rotating detonation combustion system is coupled to the upstream wall and the first radius portion of the outer wall.

16. The heat engine of claim 14, wherein the multiple fluid injection openings of the rotating detonation combustion system are defined through the first radius portion of the outer wall.

17. The heat engine of claim 14, wherein the radial wall and the outer wall of the rotating detonation combustion system each define the multiple fluid injection openings, and wherein the multiple fluid injection openings provide a flow of oxidizer, a flow of fuel, or combinations thereof, to the combustion chamber.

18. The heat engine of claim 14, wherein the rotating detonation combustion system is one of a plurality of rotating detonation combustion systems that are disposed in an adjacent circumferential arrangement around the longitudinal centerline of the heat engine, and wherein each combustor centerline is disposed at an acute angle relative to the longitudinal centerline.

19. The heat engine of claim 18, wherein the combustor centerline of the rotating detonation combustion system is disposed at a tangent angle relative to the longitudinal centerline of the heat engine.

20. The heat engine of claim 14, wherein the outer wall defines a combustion can and the rotating detonation combustion system is one of a plurality of rotating detonation combustion systems, the combustion cans of the plurality of rotating detonation combustion systems having a circumferential arrangement about the longitudinal centerline of the heat engine.

* * * * *